May 9, 1944.　　　　G. H. GILL　　　　2,348,212
ELECTRICAL FLAP CONTROL
Filed Oct. 9, 1941　　　　4 Sheets-Sheet 1

Inventor:
GEORGE HERBERT GILL;
By
Attorney.

May 9, 1944. G. H. GILL 2,348,212
ELECTRICAL FLAP CONTROL
Filed Oct. 9, 1941 4 Sheets-Sheet 3

Inventor:
GEORGE HERBERT GILL,
By
Attorney.

May 9, 1944.  G. H. GILL  2,348,212
ELECTRICAL FLAP CONTROL
Filed Oct. 9, 1941  4 Sheets-Sheet 4

Fig.5

Inventor:
GEORGE HERBERT GILL,
By

Attorney.

Patented May 9, 1944

2,348,212

UNITED STATES PATENT OFFICE 2,348,212

ELECTRICAL FLAP CONTROL

George Herbert Gill, Manhattan Beach, Calif., assignor to The Garrett Corporation, Airesearch Manufacturing Company division, Los Angeles, Calif., a corporation of California Application October 9, 1941, Serial No. 414,336

9 Claims. (Cl. 236—35)

My invention relates in general to means for controlling the heat content of a fluid, and relates in particular to improvements in means for cooling the lubricating oil of aircraft engines.

In aircraft practice it is now generally recognized that many important advantages are gained from the use of devices for cooling the oil which is used to lubricate the operating parts of internal combustion engines. Not only is the oil maintained at a viscosity which will enable it to render an efficient lubricating service, but the cooled oil is enabled to serve as a medium for absorbing heat directly from the working parts which it lubricates.

An accepted practice in aircraft is to provide a duct through which a flow of air may pass, and to place an oil cooler in the air duct in order that the flow of air may pass in heat exchanging relation to the flow of oil which is conducted through the cooler. An object of the present invention is to provide an effective means for controlling the flow of air through the cooler in such a manner that the oil, which flows from the cooler back to the engine or oil reservoir associated with the engine, will be maintained substantially constantly at a selected viscosity-temperature condition or state. Heat received by the oil from the engine produces two immediately recognized changes in the state of the oil, namely, a rise in temperature, and a change in the viscosity of the oil. The relation of temperature to viscosity in the oil is such that reference to either of these changing values may be had in controlling the flow of air through the heat exchanger or oil cooler.

An object of the invention is to provide a control means which may be employed to control the flow of air through the heat exchanger with reference to either the temperature or viscosity of the oil as a measure of the heat content of the oil. An object of the invention is to provide a control system having a part which may be associated with the heat exchanger and another part which may be mounted in the aircraft so as to operate and control a means, such as shutters or control flap, to regulate the flow of air through the heat exchanger. A special feature of the preferred embodiment of the invention is that the cooperating parts of the installation may be placed in accordance with the requirements established by the aircraft structure, without the need of designing or making a separate control system for each different type or size of aircraft. The motivating or operating means of the control system, which forms a unitary part of the invention, may be readily mounted in an aircraft structure so as to operate a flap or shutter means between closed and opened positions in accordance with the needs of the heat exchanger.

An object of the invention is to provide for use with a heat exchanger through which first and second flows of fluids are passed in heat exchanging relation, a first control element which is responsive to changes in the heat content of the first fluid, to initiate or produce controlling movements of the means which controls the flow of the second fluid, and a second control element which acts in response to movement of the airflow control means to stop the movement of the airflow control means when the required change in its position has been made.

An object of the invention is to provide a control system having a leading part which is moved in accordance with changes in the heat content of a first fluid which passes through a heat exchanger in heat exchanging relation to a flow of a second fluid, and a follow-up part which moves in accordance with the opening and closing action of the valve means for controlling the flow of the second fluid, with cooperating control means between the leading and follow-up part, these parts cooperating so as to start a proper actuation of the valve means in accordance with the change in the heat content of the first fluid, and to stop the actuation of the valve means when a change therein has been made in accordance with the change required in the flow of the second fluid to compensate for the change in the heat content of the first fluid in the heat exchanger.

A further object of the invention is to provide in cooperation with the leading and follow-up control parts referred to in the preceding paragraph, an electrical control system having resistance means in series in an electric circuit, first and second contactors moved along this resistance means by movement of the leading and follow-up control part, this electrical system being inactive when the contactors are in their coincidental relation, and becoming active as the result of relative movements causing the contactors to engage the resistance means in such spaced relation that there will be a potential difference between the contactors of sufficient magnitude to operatively energize other cooperating parts in the electrical control system.

A further object of the invention is to provide an overriding control operated in response to an increase in pressure in the first fluid to operate the valve which controls the flow of the second fluid.

An object of the invention is to provide a simple and effective pressure operated control switch and also to provide a simple and readily installed motivating means which may be connected between an air control flap and a stationary part of the aircraft structure, and which will cooperate with the remaining parts of the control system to accomplish the results and advantages herein set forth.

Further objects and advantages of the invention may appear in the following part of the specification.

Referring to the drawings which are for illustrative purposes only.

Figure 1:
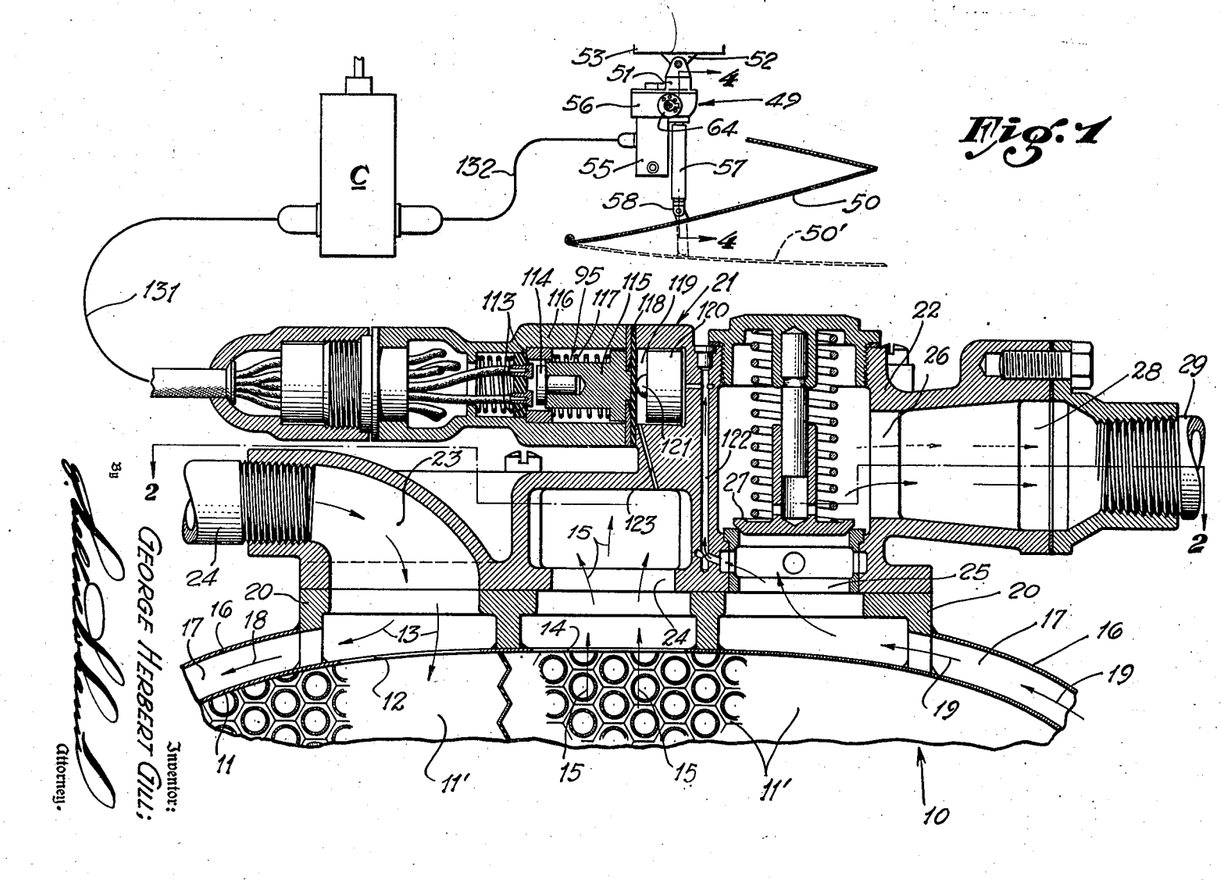
Fig. 1 is a view partly in diagrammatic form, showing a preferred embodiment of my invention, this view showing the leading control unit of the system drawn to enlarged scale, and in section as indicated by the line 1—1 of Fig. 2.
Figure 2:
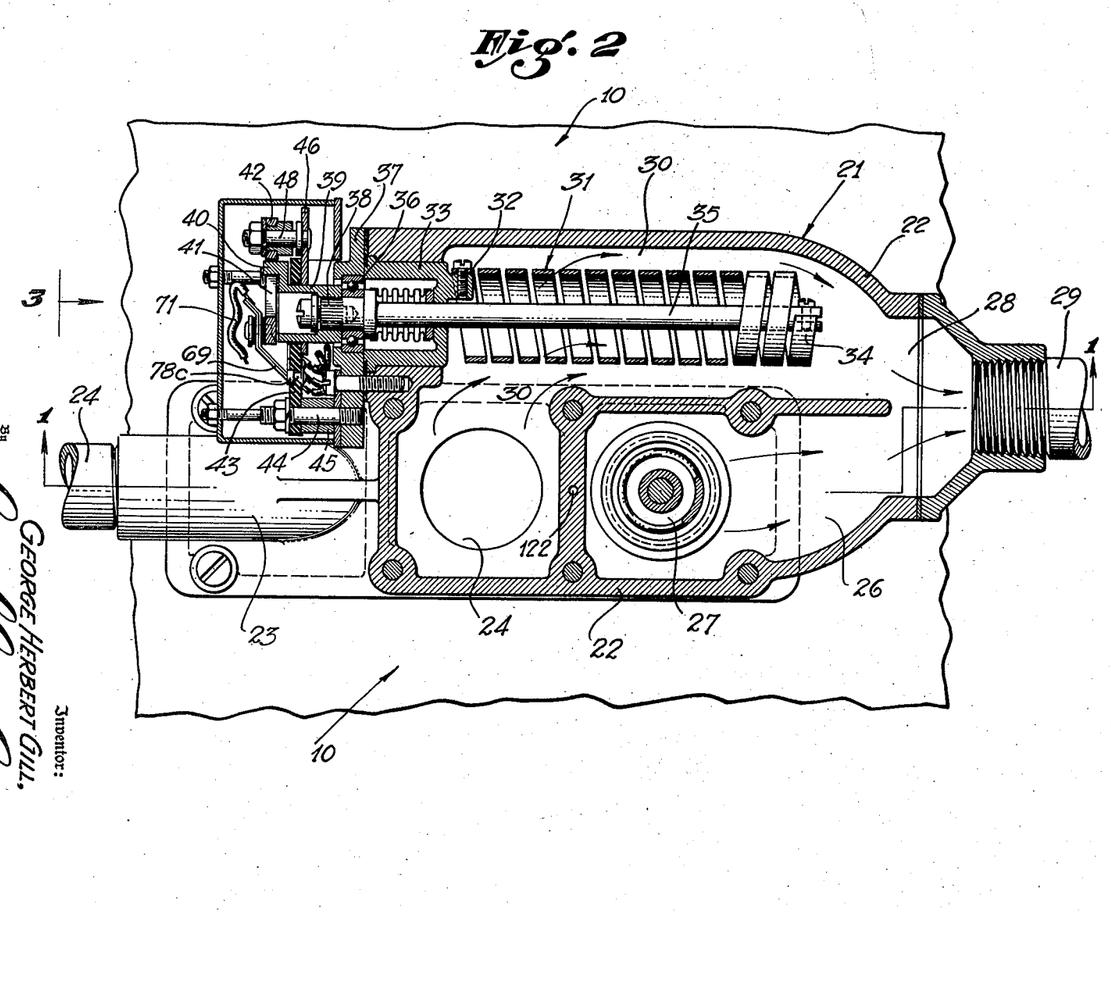
Fig. 2 is a plan section taken as indicated by the line 2—2 of Fig. 1.

In Figs. 1 and 2, I show a portion of an oil cooler 10 having a shell 11 defining a space 11' through which oil may flow from an inlet opening at 12, as indicated by the arrow 13 of Fig. 1, and from out of which the cooled oil may flow through an outlet opening 14 as indicated by the arrow 15. In accordance with accepted practice, the oil cooler may have walls 16 defining a warm up space 17 through which oil may flow as indicated by arrows 18 and 19 when resistance is built up within the oil cooling spaces of the cooler as the result of congealing of the oil therein due to a low heat condition in the oil. By means of a fitting 20, a leading control unit 21 is secured to the cooler 10, this control unit 21 having a casing 22 with an inlet passage 23, which receives the hot oil from the engine through piping 24 and conveys the same to the inlet opening 12, and to the warm up space 17.

As shown in Fig. 1, the casing 22 has an oil outlet port 24 which communicates with the outlet opening 14 of the cooler 10, and a by-pass port 25 to provide a means of communication between the rear or outlet end of the warm up space 17 and the by-pass passage 26 of the casing 22, which passage 26 is provided with a spring-pressed valve 27 arranged to open and permit the bypass of oil through the outlet opening 28 to the return piping 29, when the pressure of oil in the warm up space 17 builds up to a prescribed value as the result of resistance to the flow of oil through the cooling spaces 11' of the cooler, occasioned by the bringing of the oil in the cooler to such low temperature that it congeals in the cooler.

As shown in Fig. 2, the oil outlet port 24 communicates with an elongated warm oil passage 30, which leads to the outlet opening 28 of the shell 22 so that the normal flow of cooled oil from the cooler 10 may pass into the return piping 29. In the passage 30 there is a means 31 responsive to the state or condition of the oil directly related to or resulting from the heat content of the oil which has passed through the cooler. By "state or condition" of the oil, I refer to either its temperature or viscosity produced by the heat content thereof, but for simplicity of disclosure I prefer to show the responsive means 31 as a spiral bi-metallic thermostat having one end 32 secured to a removable cylindric supporting body 33 and having the other end 34 thereof connected to a rotatable shaft 35 extending through the supporting body 33 and having the leftward extremity thereof carried in a bearing 36 supported by a cover plate 37 which clamps the supporting body 33 in the position thereof shown. The end of the shaft 35 which projects through the bearing 36 has splines 38 to receive the hub of a crank member 39 having an eccentric crank pin 40 to engage a slot 41 in a part or lever 42, so as to move this part 42 through consecutive positions in a range of movement, in accordance with the changes in the heat content of the oil which moves through the passage 30.

Figures 3, 4, 6:
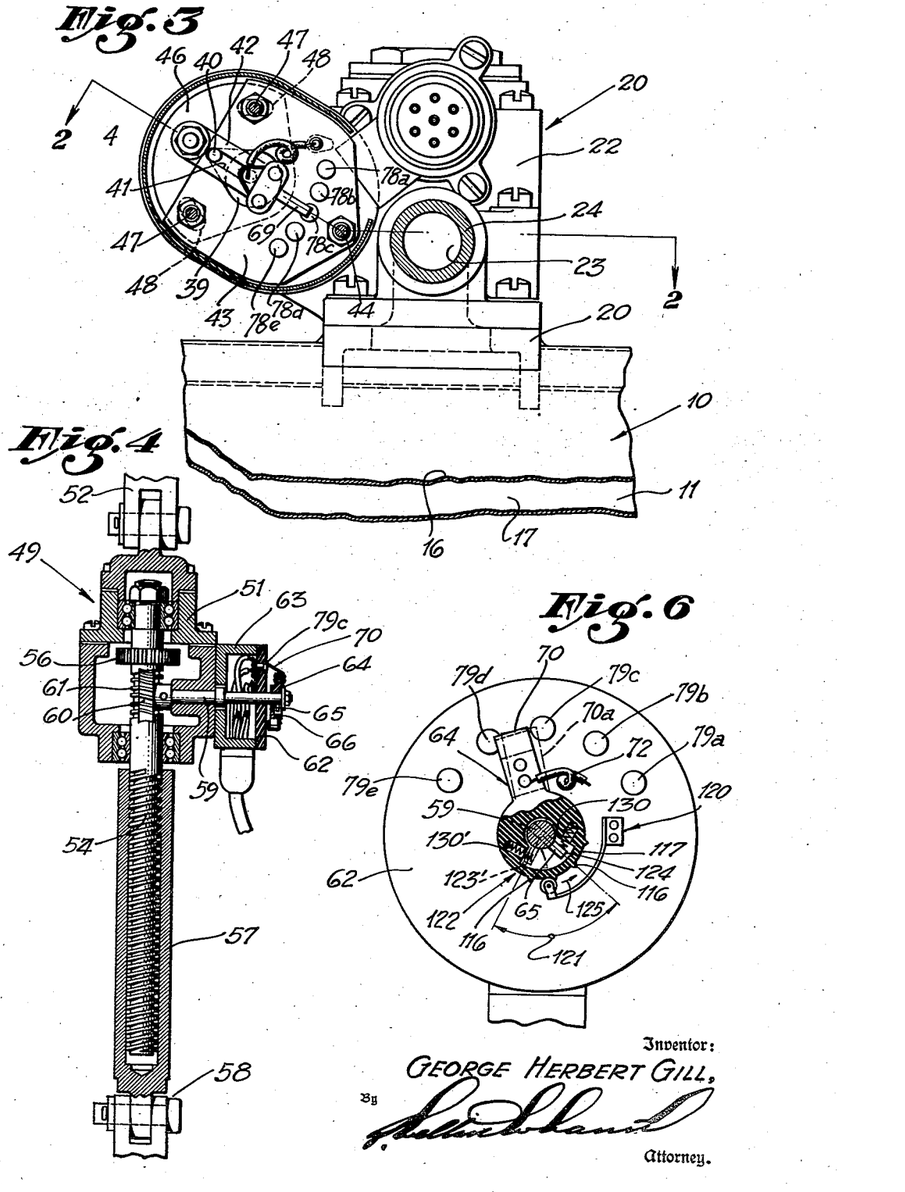
Fig. 3 is an end view of the structure shown in Fig. 2, looking in the direction of the arrow 3 of Fig. 2.
Fig. 4 is an enlarged fragmentary longitudinal section through the motivating means, taken as indicated by the line 4—4 of Fig. 1.
Fig. 6 is an enlarged view of the follow-up control mechanism of the invention, taken from the position of arrow 6 in Fig. 4.

As shown in Figs. 2 and 3, a plate 43 of insulating material is secured to the cover plate 37 by means of a stud 44 and a spacer 45. The hub of the crank 39 extends through an opening in the plate 43 so that the crank pin 40 thereof will be positioned to swing across a portion of the plate 43. A metal plate 46 is secured to the rear face of the plate 43 by screws 47, Fig. 3, which project through slots 48 in the plate 43 lying in a circle around the axis of rotation of the crank member 38. The lever 42 is supported on a pin 48 which projects forwardly from the upper portion of the plate 46. Adjustment of the position of the lever 42 for any selected heat content of the oil to which the thermostat 31 is subjected, is accomplished by two means, namely by changing the position of the crank member 39 on the splines 38 of the shaft 35, and by swinging the pivot pin 48 around the axis of rotation of the crank member 38 by shifting the plate 46 on the plate 43.

The lever 42 comprises a part of the control system which is moved in accordance with changes in the heat content of the oil engaging the thermostat 31, and which cooperates with other parts to initiate the action of a motivating device 49 arranged to move an air flow control means, shown in Fig. 1 as a flap 50, adapted when in closed position as shown in full lines to substantially cut off the flow of air through the cooler 10 and to permit a flow of air through the cooler when it is moved to an open position such as shown in dotted lines 50'.

As shown in Figs. 1 and 4, the motivating means comprises a casing 51 arranged to be pivotally secured by means of a bracket 52 to a portion 53 of the aircraft structure, a screw 54 rotatively supported in the casing and projecting therefrom, a motor 55, and reducing gear means 56 for rotating the screw 54 at relatively slow speed, and a threaded sleeve 57 having means as shown at 58 whereby it may be pivotally connected to the flap 50, this sleeve 57 receiving the threaded portion of the screw 54 and moving back and forth in axial direction as the screw 54 is rotated in clockwise and anti-clockwise direction.

The casing 51 of the motivating device 49 carries a shaft 59 having on the inner end thereof a worm wheel 60 to engage a worm 61 on the stem of the screw 54, whereby the shaft 59 will be given limited rotary movement in keeping with the rotation of the screw 54 and, therefore, proportionate to and in accordance with the opening and closing movements of the flap 50. This shaft 59 extends through a dielectric plate 62 supported on the casing 51 by a box 63. The shaft 59 likewise projects through a lever or part 64 adapted to be moved back and forth in accordance with or in response to movement of the shutter 50 through consecutive positions in its range of movement between open and closed positions. The shaft 59 carries a radial lug 65, Figs. 4 and 6, arranged to engage the lever 64 as the shaft 59 is rotated, but having play in a recess 66 in the lever 64, so that the shaft 59 will be rotated through a prescribed arc 121, and the shutter 50 will be moved through a corresponding prescribed distance, before the lever 64 starts to move, this being for a purpose which will be hereinafter pointed out.

Figure 5:
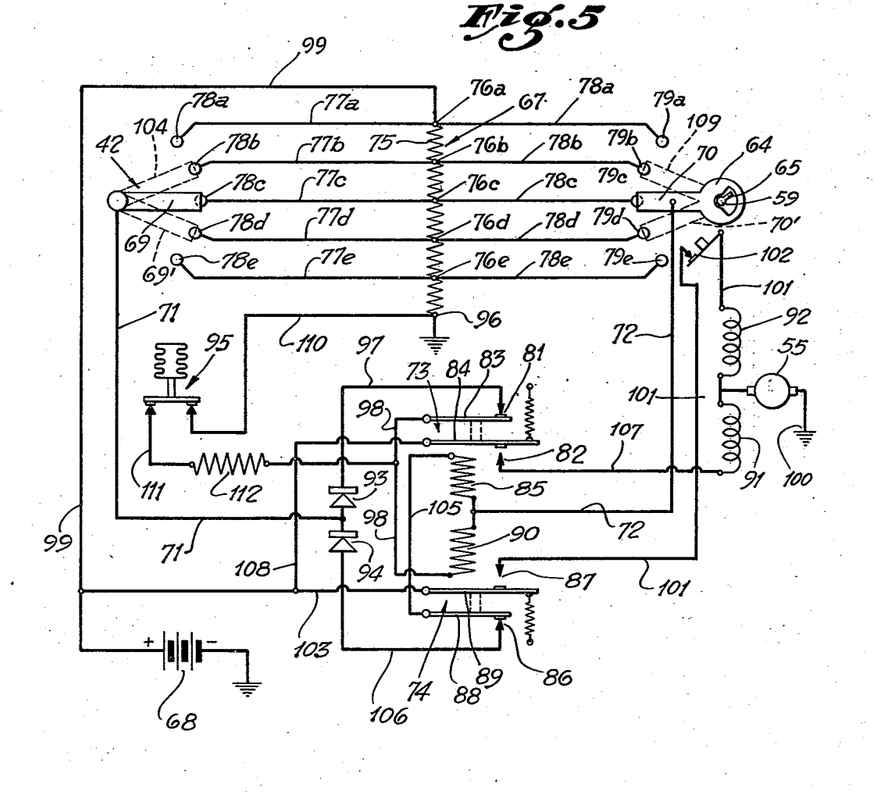
Fig. 5 is a diagram showing the electrical equipment of the control system.

In Fig. 5 I have diagrammatically shown the electrical control system by which operation of the motivating device 29 is accomplished. Therein I employ a resistance means 67 in series with a direct current supply shown as a battery 68, having the negative pole thereof grounded. The previously described leading control part 42 carries a contactor 69 and the follow-up control part 64 carries a contactor 70. The contactors 69 and 70 are arranged to be moved along the resistance means 67 and to engage the same. Conductors 71 and 72 are shown respectively extending from the contactors 69 and 70. These conductors 71 and 72 form part of a control circuit having therein switch means 73 and 74, shown as a relay, actuated when the contactors 69 and 70 connect spaced points along the resistance means so that the potential difference between the contactors 69 and 70 produces a current flow through the control circuit. The resistance means 67 includes a potential resistor 75 and means whereby the contactors 69 and 70 may be electrically connected with points 76a to 76e along the resistor 75. So that the contactors 69 and 70 may be remotely located, as at the control unit 21 and the shutter 50 respectively, I provide conductors 77a to 77e and 78a to 78e extended from the points 76a—76e to contacts 78a—78e and 79a—79e, arranged respectively to be traversed by the contactors 69 and 70. Accordingly, the contacts, 78a—78e, are mounted in the dielectric plate 43 of Figs. 2 and 3 so as to be in close association with the thermostatic control mechanism, and the contacts 79a—79e are mounted in the dielectric plate 62, Fig. 4, so as to be engaged by the contactor 70 carried by the arm 64 when such arm 64 is moved through rotation of the shaft 59 in accordance with the movement of the flap 50 by the motivating device 49.

The relay 73 has contacts 81 and 82, contactors 83 and 84, and an electromagnet 85, which, when energized, will move the contactors 83 and 84 from the positions in which they are shown, so that the contactor 83 will be moved away from the contact 81 and the contactor 84 will be moved into engagement with the contact 82. The relay 74 has contacts 86 and 87, contactors 88 and 89, and an electromagnet 90, which may be energized so as to move the contactor 88 from engagement with the contact 86, and to move the contactor 89 into engagement with the contact 87. The motor 55 of the motivating device 49 has field windings 91 and 92 separately energizable so as to drive the motor 55 in opposite directions. The electrical control system also has in with the electromagnets 85 and 90 direct current valves or rectifiers 93 and 94, the purpose of which will be later brought out. The system likewise has a pressure controlled switch 95 arranged to override the action of the other controls for the motor 55, so that when pressure is built up in the oil cooler the motor 55 will be operated to close the flap 50. The resistance means 67, the relays 73 and 74, and the rectifiers 93 and 94 are mounted in a casing C, Fig. 1, which may be mounted anywhere between the unit 21 and the motivating means 49, and electrical connections between these parts may be made through cables 131 and 132.

The operation of the electrical control system will be understood from the following.

When the contactors 69 and 70 are both connected with substantially the same point along the resistor 75, there will be substantially no potential difference between the conductors 71 and 72, and accordingly the relays 73 and 74 will remain in static condition. Such positioning of the contactors 69 and 70 is shown in full lines of Fig. 5. Should cooling of the thermostat 31 of Fig. 2 cause the contactor 69 to move downward from its full line position of Fig. 5 to a position to engage the contact 78d, as shown by dotted lines 69', the contactor 69 will then be connected with the point 76d of the resistor 75 and the potential difference then existing between the contactors 69 and 70 will produce a current flow through the control circuit. The current flow expressed herein refers to the flow of negative electrons toward the positive pole of the battery 68. The potential difference between the points 76d and 76c will result in a flow of current from the negative ground connection 96 to the point 76d, thence through the associated conductor 77d to the contactor 69, then in the position 69'. This negative current flow will then pass through the conductor 71 to the point of connection between the rectifiers 93 and 94, and will pass through the rectifier 93 and a conductor 97 to the contact 81 of the relay 73. The current will then flow through the contactor 83, a conductor 98, the electromagnet 90, a conductor 72 which leads to the contactor 70, the conductor 78c which connects with the point 76c, and then through the upper portion of the resistor 75 and a conductor 99 to the positive pole of the battery 68.

Energization of the electromagnet 90 will result in actuation of the relay 74, so that the movement of the contactor 89 into engagement with the contact 87 will connect the positively energized conductor 99 with the motor winding 92. When the contactor 89 engages the contact 87, a current will flow from the motor ground 100 and through a circuit which includes the field winding 92, a conductor 101 with a limit switch 102 therein, and a conductor 103 which connects the contactor 89 with the conductor 99. As the result thereof, the motor 55 will be rotated in a direction to move the flap 50 toward closed position and to move the contactor 70 downward from the position in which it is shown in full lines of Fig. 5, toward the dotted line position thereof indicated by 70', whereby the contactor will be brought into engagement with the contact 79d, which is connected to the same point 76d of the resistor 75 as the contactor 69 when it is positioned as shown by dotted lines 69'. It will be understood that when the contactor 70 is moved into the position 70', the potential difference between the conductors 70 and 71 will be reduced to substantially zero value so that the electromagnet 90 will be deenergized and the relay 74 will return to the position in which it is shown in full lines in Fig. 5, thereby discontinuing the operation of the motor 55 with the flap 50 in a position in its range of movement corresponding to the position of the leading or control contactor 69 in its range of movement.

With the contactors 69 and 70 in the positions in which they are shown in full lines in Fig. 5, should there be an increase in the temperature of the oil flowing through the passage 30, Fig. 2, heating of the thermostat 31 will result in movement of the contactor 69 upward from the full line position in which it is shown in Fig. 5 to the dotted line position thereof indicated by the numeral 104. The potential difference between the two sides of the control circuit represented by the conductors 71 and 72 will be then between the points 76c and 76b, and current will then flow from the point 76c to the contact 79c, through the conductor 72, the electromagnet 85, a conductor 105, the contactor 68, the contact 86, the conductor 106, the conductor 71, and thence on to the point 76b through the contactor 69 in the raised position thereof indicated by dotted lines 104. This will result in energization of the electromagnet 85 to move the contactors 83 and 84 of the relay 73 downward from the positions thereof, removing the contactor 83 from engagement with the contact 81 and moving the contactor 84 into engagement with the contact 82 so as to close a circuit whereby current may flow from the motor ground 100 through the field winding 91 and through conductors 107, 108 and 109 to the conductor 99 which is connected to the positive terminal of the battery 68. The energization of the winding 91 will cause the motor 55 to rotate in such direction that the flap 50 will be moved toward open position and the contactor 70 will be moved toward and into the position thereof indicated by the dotted lines 109 wherein the potential difference between the conductor 71 and 72 will be again brought to substantially zero value to deenergize the electromagnet 85 and stop the motor 55 as the result.

It will be noted that the electromagnets 85 and 90 and the rectifiers 93 and 94 are connected respectively in parallel between the conductors 71 and 72, and that the orientation of the rectifiers 93 and 94 is such that when the current flow is from the lower end of conductor 71 to conductor 72 the flow of current will be only through the rectifier 93 and the electromagnet 90, the rectifier 94 blocking the portions of the circuit leading through the electromagnet 85. When the current flow is from the lower end of conductor 72 to conductor 71, the current will flow only through electromagnet 85 and rectifier 94, the flow through the electromagnet 90 being then blocked by the rectifier 93. Accordingly, when the contactor 69 is above the contactor 70, the electromagnet 90 will be energized, and when the contactor 69 is above the contactor 70, the electromagnet 85 will be energized.

The pressure controlled switch 95 is connected to the lower end of the resistor 75 by a conductor 110. It is also connected by a conductor 111, containing a protective resistance 112 with the conductor 98. Closing of the pressure control switch 95 will close a circuit including the electromagnet 90 and current will flow from the ground 96 through conductors 110 and 111 to the conductor 98. Since the rectifiers 93 and 94 are so positioned that current can flow from the conductor 71 only to the conductor 97, and not from 97 to 71, the current will pass through the electromagnet 90 in the direction of the arrow 90' associated therewith, to the conductor 72 which connects through the contactor 70 with the resistance means 67, the upper portion of which resistance means 67 is connected through the conductor 99 with the positive pole of the battery 68. This will result in actuation of the relay 74 to energize the winding 92 associated with the motor 55 to move the flap 50 toward closed position, and when closed position of the flap is reached, the member 64 will engage and open the limit switch 102, thereby breaking the circuit through the winding 92, to stop the motor 55 with the flap 50 in closed position. It will be noted that when the relay 74 is actuated by energization of the magnet 90, the contactor 88 will be removed from engagement with the contact 86, so that the circuit through the electromagnet 85 is opened, to prevent actuation of the relay 73 as the result of movement of the contactor 69 into a position spaced below the relative position of the contactor 70. The pressure control switch 95 thus overrides the control which may be exerted by the contactors 69 and 70 in the sense that it takes the control away from them and renders them ineffective until the switch 95 is again opened.

The mechanism of the control switch 95 is shown in Fig. 1. It comprises a pair of contacts 113 arranged to be bridged by a moving contact 114, carried in a body 115, which is movable in a switch casing 116 against the action of a spring 117. The end of the body 115 opposite from the contact 114 confronts the central portion of a gasket 118 of a flexible material which may comprise synthetic rubber. In a chamber 119 on the opposite side of the diaphragm 118 there is a loosely fitted piston 120, having a projection 121 to deflect the central portion of the diaphragm 118 in leftward direction and move the body 115 so as to carry the contact 114 into engagement with the contacts 113. The casing 22 of the control unit 21 has an oil pressure passage 122 leading from the port 25 to rightward portion of the chamber 119, and a bleeder passage 123 connects the leftward end of the chamber 119 with the oil passage 30. During the normal operation of the cooler, that is to say when oil is flowing in and out through the openings 12 and 14 of the cooler, the pressure transmitted through the passage 122 to the rightward end of the piston 120 will not be sufficient to overcome the force of the spring 117, and accordingly the pressure control switch 95 will remain open. However, should pressure build up in the oil cooling space 11' of the cooler, as the result of the congealing of oil in the passages of the cooler or for any other reason, this pressure will be transmitted through the warm up passage 17 to the bypass port 25, and such pressure increase will be transmitted through the passage 122 to the rightward end of the piston 120, forcing the same in leftward direction to shift the body 115 and its contact 114 in leftward direction to bridge the contact 113 of the pressure switch 95. This action occurs at a pressure lower than that at which the relief valve opens.

To avoid the possibility of the contactor 70 being stopped in an intermediate position between adjacent contacts 79, a snap action is provided as shown in Fig. 6 by forming four raised points 116 in the body of the lever 64, these points being separated by flat portions 117. A roller 118 is forced toward the body of the member 64 by means of a spring 119 supported on plate 62 by a bracket 120 and springs 130 and 130' are supported in the body 116 so as to project into the recess 66 and engage opposite sides of the lug 65. Accordingly, when the lug 65 is moved by rotation of the shaft 59 from the position in which it is shown in Fig. 6 one of the springs will be compressed, and finally, when movement is transmitted directly from the lug to the member 64, the engaged point will be moved from one side to the other of the roller 118, and the compressed spring may then act to snap the member over to its next position wherein the contactor 70 will engage a contact adjacent the one engaged at the start of the described action.

The purpose of the play or lost motion in the second control means 122 can be explained as follows. If the motivating device 49 has previously moved in the direction indicated by the arrow 125, lug 65 will be in position 124 and lever 64 will, say, have moved to bring contactor 70 into contact with contact 79d. If, then, contactor 70 is on contact 79d, and by reason of a change of condition of the oil, it is necessary to bring contactor 70 back, to contact 79c, the lug 66 must travel through nearly the arc 121 before it reaches the position 123' to compress the spring 130' and ultimately shift the member 64 in clockwise direction to carry the contactor 70 into engagement with the contact 79c, as shown by dotted lines 70a. Therefore, the lug 65 will have been moved through its prescribed arc of movement 121 at the time the contactor is shifted from the contact 79d to the contact 79c.

I claim as my invention:

1. In a cooling system of the class described, having a heat exchanger through which a flow of a first fluid which tends to congeal at low temperatures and a flow of a second fluid pass in heat exchanging relation, the combination of: control means having a part moving through consecutive positions in a range of movement in response to corresponding changes in the temperature of the first fluid; a closure to control the flow of said second fluid through the heat exchanger; motor means operatively connected to said closure and operating under control of said control means to move said closure throufh consecutive positions between opened and closed, corresponding to the positions of said part of said control means; and means operating in response to a pressure increase in said first fluid in said heat exchanger as the result of the thickening of said first fluid in said heat exchanger to cause said motor means to move said closure toward the closed position thereof.

2. In a control system of the class described, having a heat-exchanger through which a flow of a first fluid which tends to congeal at low temperatures and a flow of a second fluid pass in said heat exchanging relation, the combination of: control means having a part moving through consecutive positions in a range of movement in response to changes in temperature of said first fluid in a range from hot to cold; a closure movable through a range of positions from opened and closed to vary the flow of said second fluid through said heat exchanger; a motor for moving said closure back and forth through its range of movement; and electrical control means for controlling the operation of said motor so as to cause said closure to follow said part through positions corresponding to the positions into which said part may be moved in response to changes in the temperature of said first fluid, said electrical control means comprising current flow controlling current flow controlling means operated by said part and by said closure, cooperating whenever said part moves out of a position corresponding to a position of said closure to actuate said motor in a manner to move said closure into a position corresponding to the new position of said part, and discontinue the actuation of said motor, and said electrical control means also having current flow controlling means operating in response to an increase in pressure in said first fluid in said heat exchanger as the result of thickening thereof cooperating with the rest of said electrical control means to override the controlling effect of said part on said control means and actuate said motor so that the same will move said closure toward closed position.

3. In a control system of the class described, having a heat exchanger through which flows of oil and air pass in said heat exchanging relation, the combination of: control means having a part moving through consecutive positions in a range of movement in response to changes in the viscosity-temperature state of said oil; a closure movable through a range of positions from opened and closed to vary the flow of said air through said heat exchanger; a motor for moving said closure back and forth through its range of movement; and electrical control means for controlling the operation of said motor so as to cause said closure to follow said part through positions corresponding to the positions into which said part may be moved in response to changes in the temperature of said oil, said electrical control means comprising current flow controlling means operated by said part and by said closure, cooperating whenever said part moves out of a position corresponding to a position of said closure to actuate said motor in a manner to move said closure into a position corresponding to the new position of said part, and discontinue the actuation of said motor, and said electrical control means also having current flow controlling means operating in response to an increase in pressure in said oil in said heat exchanger as the result of thickening of the oil in the cooler cooperating with the rest of said electrical control means to override the controlling effect of said part on said control means and actuate said motor so that the same will move said closure toward closed position.

4. In a control system of the class described, having a heat exchanger through which flows of first and second fluids pass in said heat exchanging relation, the combination of: control means having a part moving back and forth through consecutive positions in a range of movement in response to fall and rise in temperature of said first fluid in a range from hot to cold; a closure movable through a range of positions from opened and closed to vary the flow of said second fluid through said heat exchanger; motivating means for moving said closure back and forth through its range of movement; and an electrical control system for controlling the operation of said motivating means so as to cause said closure to follow the movement of said moving part of said control means, said electrical control system comprising resistance means connected in series in an electric circuit, first contactor means moved consecutively along said resistance means in response to said movement of said moving part, second contactor means also moving consecutively along said resistance means but in response to movement of said closure, a circuit including in series said contactor means and the portion of said resistance means between said contactor means, and means in said circuit, operating in response to a flow of current through said circuit occasioned by displacement of said first contactor means along said resistance means to a position spaced from said second contactor means, to cause actuation of said motivating means to move said closure so as to bring said second contactor means into a position corresponding to the new position of said first contactor means.

5. In a control system of the class described, having a heat exchanger through which flows of first and second fluids pass in said heat exchanging relation, the combination of: control means having a part moving back and forth through consecutive positions in a range of movement in response to fall and rise in temperature of said first fluid in a range from hot to cold; a closure movable through a range of positions from opened and closed to vary the flow of said second fluid through said heat exchanger; motivating means for moving said closure back and forth through its range of movement; and an electrical control system for controlling the operation of said motivating means so as to cause said closure to follow the movement of said moving part of said control means, said electrical control system comprising resistance means connected in series in an electric circuit, a set of first contact means connected consecutively to spaced points along said resistance means, a set of second contact means connected consecutively to spaced points along said resistance means, said contactor means movable along and engageable with the members of said first set of contact means, in response to movement of said moving part, second contactor means also movable along and engageable with the members of said second contact means but in accordance with the movement of said closure, a circuit including in series said contact means and the portion of said resistance means between the contact means engaged by said contactor means, and means in said circuit, operating in response to a flow of current through said circuit occasioned by displacement of said first contactor means to a position to engage a first contact means which connects to said resistance means at a point spaced from the point of connection of said contact means with said resistance means, to cause actuation of said motivating means to move said closure so as to bring said second contactor means into a position corresponding to the position of said first contactor means.

6. In a control system of the class described, having a heat exchanger through which a flow of a first fluid which tends to congeal at low temperatures and a flow of a second fluid pass in said heat exchanging relation, the combination of: control means having a part moving back and forth through consecutive positions in a range of movement in response to fall and rise in temperature of said first fluid in a range from hot to cold; a closure movable through a range of positions from opened and closed to vary the flow of said second fluid through said heat exchanger; motivating means for moving said closure back and forth through its range of movement; an electrical control system for controlling the operation of said motivating means so as to cause said closure to follow the movement of said moving part of said control means, said electrical control system comprising resistance means connected in series in an electric circuit, first contactor means moved consecutively along said resistance means in response to said movement of said moving part, second contactor means also moving consecutively along said resistance means but in accordance with the movement of said closure, a circuit including in series said contactor means and the portion of said resistance means between said contactor means, and means in said circuit, operating in response to a flow of current through said circuit occasioned by displacement of said first contactor means along said resistance means to a position spaced through said second contactor means, to cause actuation of said motivating means to move said closure so as to bring said second contactor means into a position corresponding to the position of said first contactor means; auxiliary means movable as the result of an excess pressure condition in said first fluid in said heat exchanger resulting from thickening of said first fluid; and means cooperating with said control system when said auxiliary means has been so moved, to cause an overriding actuation of said motivating means to move said closure toward closed position.

7. In a control system of the class described, having a heat exchanger through which flows of first and second fluids pass in heat exchanging relation, the combination of: a leading control part moving back and forth through consecutive positions in a range of movements in accordance with fall and rise in the heat content of said first fluid; a closure for controlling the flow of said second fluid through said heat exchanger; a follow-up control part; means connecting said closure and said follow-up control part, so that movements of said closure through opened and closed positions will result in movement of said follow-up control part back and forth through consecutive positions in a range of movement, said means having play therein so that said closure will move a prescribed distance before said follow-up control part is moved; motivating means operative to move said closure; and an electrical system for controlling the operation of said motivating means, said electrical system having starting means controlled by said leading control parts to initiate the operation of said motivating means and stopping means controlled by said follow-up control part to stop the operation of said motivating means.

8. In an oil cooling system of the character described having a cooler situated in a path of flow of air, a delivery duct to carry the heated oil to the cooler and a return duct to carry the oil away from the cooler, the combination of: means forming a passage connecting said delivery duct to the inlet of the cooler; a wall forming an outlet passage connecting the outlet of the cooler to said return duct, said wall having an opening therein; a thermostat in said outlet passage exposed to heat from the flow of oil therethrough; a first movable contactor outside said opening having means extending through said opening and engaging said thermostat so as to be moved thereby through consecutive positions in accordance with the changes in temperature of the oil in said outlet passage; a series of contacts arranged so as to be engaged by said contactor; closure means movable so as to control the flow of air through said cooler; a motor to operate said closure means; a second contactor connected so as to move back and forth in accordance with the opening and closing movements of said closure means; a series of second contacts disposed so as to be consecutively engaged by said second contactor; electrical control means connected to and controlled by the flows of electric current through said contacts in accordance with the positions of said contactors to control the operation of said motor so as to move said closure in accordance with the movement of said first contactor whenever said first contactor moves out of a position corresponding to the position of said second contactor; and means operating in response to a pressure increase in the oil resulting from a thickening thereof in said cooler, to override the normal controlling action of said control means and cause operation of said motor so that it will close said closure means.

9. In an oil cooling system of the character described having a cooler situated in a path of flow of air, a delivery duct to carry the heated oil to the cooler and a return duct to carry the oil away from the cooler, the combination of: means forming a passage connecting said delivery duct to the inlet of the cooler; a wall forming an outlet passage connecting the outlet of the cooler to said return duct, said wall having an opening therein; a thermostat in said outlet passage exposed to heat from the flow of oil therethrough; a first movable contactor outside said opening; pivot means to swingably support said contactor; adjustment means for moving said pivot means; crank means having a pin element engaging said contactor, said crank having means extending through said opening in said wall and engaging said thermostat so that the thermostat will rotate said crank means and move said contactor through consecutive positions in accordance with the changes in temperature of the oil in said outlet passage; a series of contacts arranged so as to be engaged by said contactor; closure means movable so as to control the flow of air through said cooler; a motor to operate said closure means; a second contactor connected so as to move back and forth in accordance with the opening and closing movements of said closure means; a series of second contacts disposed so as to be consecutively engaged by said second contactor; and electrical control means connected to and controlled by the flows of electric current through said contacts in accordance with the positions of said contactors to control the operation of said motor so as to move said closure in accordance with the movement of said first contactor whenever said first contactor moves out of a position corresponding to the position of said second contactor.

GEORGE HERBERT GILL.